United States Patent [19]
Wakui et al.

[11] Patent Number: 4,931,263
[45] Date of Patent: Jun. 5, 1990

[54] WET-PROCESS STACK GAS PURIFICATION METHOD

[75] Inventors: Hitoshi Wakui; Nobuo Kiyohara, both of Yokohama; Haruo Nishino; Osamu Yamamoto, both of Kawasaki, all of Japan

[73] Assignee: Chiyoda Chemical Engineering and Construction Co., Ltd., Yokohama, Japan

[21] Appl. No.: 187,661

[22] PCT Filed: Jul. 27, 1987

[86] PCT No.: PCT/JP87/00550
§ 371 Date: Mar. 25, 1988
§ 102(e) Date: Mar. 25, 1988

[87] PCT Pub. No.: WO88/00858
PCT Pub. Date: Feb. 11, 1988

[30] Foreign Application Priority Data
Jul. 31, 1986 [JP] Japan .................. 61-178752

[51] Int. Cl.$^5$ .................. B01D 45/00; B01D 46/00; B01D 53/00; C01B 17/00
[52] U.S. Cl. .................. 423/215.5; 423/242
[58] Field of Search .......... 423/242 A, 244 A, 215.5, 423/242 R, 244 R

[56] References Cited
U.S. PATENT DOCUMENTS

| | | | |
|---|---|---|---|
| 3,904,742 | 9/1975 | Akimoto | 423/242 |
| 3,948,608 | 4/1976 | Weir | 423/242 |
| 3,985,860 | 10/1976 | Mandelik et al. | 423/242 |
| 4,156,712 | 5/1979 | Kanai et al. | 423/242 |
| 4,312,646 | 1/1982 | Fattinger | 55/218 |
| 4,618,482 | 10/1986 | Shinoda et al. | 423/242 |

FOREIGN PATENT DOCUMENTS 2740039  3/1979  Fed. Rep. of Germany .
2247272  9/1975  France .
2165466A 10/1984 United Kingdom .

Primary Examiner—Gregory A. Heller
Attorney, Agent, or Firm—Armstrong, Nikaido, Marmelstein, Kubovcik & Murray

[57] ABSTRACT

A wet-process stack gas purification method and apparatus wherein stack gas is scrubbed by bubbling it into a first scrubbing liquid while maintaining the level of the first scrubbing liquid. The above scrubbed gas is subjected to a counter-current contact with a second scrubbing liquid in a scrubbing tower to further purify the gas. The method and apparatus can attain a highly remarkable decontamination effect, and the apparatus is simple in structure and small in size.

2 Claims, 4 Drawing Sheets

WET-PROCESS STACK GAS PURIFICATION METHOD

TECHNICAL FIELD

The present invention relates to a method of and apparatus for purification of stack gas, and more specifically, a purification method and apparatus which are particularly useful in cases where an extremely high effect of decontamination should be attained as in for example decontamination of stack gas from a radioactive waste incinerator.

BACKGROUND ART

Herein the present invention will be described, taking an instance in the cases of radioactive waste.

Conventionally known methods of the treatment and disposal of stack gas from radioactive waste incinerators are dry-processes utilizing a ceramic filter for example and wet-processes utilizing a venturi scrubber for example.

In order to attain a high decontamination factor according to such known methods, usually it is adopted to repeatedly effect a decontamination treatment. As a result of this, it is required to provide installation of a large scale and accordingly a building of a large scale, whereby the installation cost has been expensive in the prior art.

With the dry-processes, further, although they can take effect in capturing solids, they can take almost no effect in removing gaseous harmful substances and volatile matters, for example iodine.

The present invention centers, in its objects, upon providing a method and apparatus by which radioactive solids, gaseous harmful substances and volatiles can be removed at the same time and yet a great extent of scale-down of the installation can be realized while, in the light of the decontamination factor, an effect which is comparable to ones in the cases of 3- or more-stage wash-treatment methods in the prior art can be attained.

DISCLOSURE OF THE INVENTION

The wet-process stack gas purification method for attaining the above object according to the present invention is of the type by which dust and other contaminants contained in stack gas are removed by contacting the stack gas with a scrubbing liquid comprising the steps of scrubbing the stack gas by bubbling the gas out of a stack gas introduction pipe into a first scrubbing liquid while keeping constant the level of the scrubbing liquid; further purifying the above scrubbed gas by subjecting it to counter-current contact with a second scrubbing liquid in a scrubbing tower; recycling the used first scrubbing liquid into the stack gas introduction pipe to cool stack gas being sent thereinto; and recycling the used second scrubbing liquid into the scrubbing tower.

Then, the wet-process stack gas purification apparatus according to the present invention is of the type in which dust and other contaminants contained in stack gas are removed by contacting the stack gas with a scrubbing liquid comprising a first scrubbing tank provided with means for maintaining constant the level of a first scrubbing liquid, a stack gas introduction pipe extending into the first scrubbing liquid from above the level of the first scrubbing liquid and having an opening provided with a gas dispersing means, and a scrubbing tower in which the stack gas scrubbed with the first scrubbing liquid is subjected to counter-current contact and further purified with a second scrubbing liquid, wherein means is provided for recycling the first scrubbing liquid in the first scrubbing tank into the stack gas introduction pipe and ejecting the recycled scrubbing liquid into the stack gas being introduced into the introduction pipe and means is also provided for recycling into the scrubbing tower the second scrubbing liquid contacted with the stack gas scrubbed with the first scrubbing liquid.

BEST MODE FOR CARRYING OUT THE INVENTION

Initially, the invention will be described in connection with the wet-process stack gas purification apparatus in conjunction with embodiments thereof illustrated in the accompanying drawings.

Figure 1:
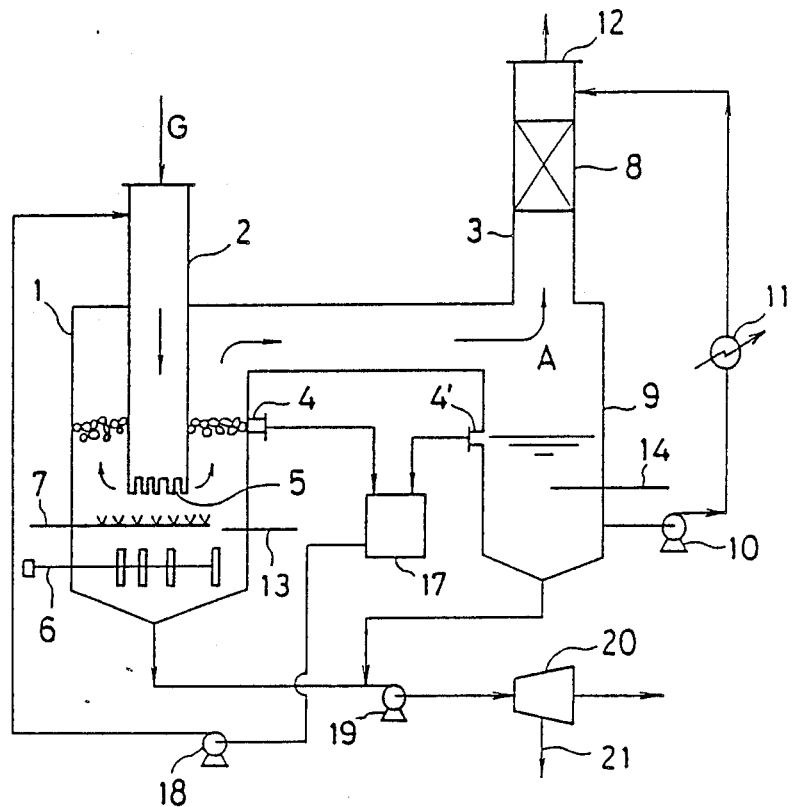
FIG. 1 is a schematic view, showing an embodiment of the wet-process stack gas purification apparatus according to the present invention.

As shown in FIG. 1, the wet-process stack gas purification apparatus according to the invention comprises a first scrubbing tank 1, a stack gas introduction pipe 2 extending in the first scrubbing tank 1 into a scrubbing liquid from above the level of this liquid and having an opening provided with a gas dispersing means, and a scrubbing tower 3 in which to further purify the stack gas scrubbed in the first scrubbing tank 1.

The scrubbing liquid in the first scrubbing tank 1, namely a first scrubbing liquid, may be water. However, where sulfur oxides and so forth are contained in the stack gas to be treated, together with dust, it is desirable to use an aqueous caustic soda solution or a suspension solution or an aqueous solution of calcium hydroxide, magnesium hydroxide or a carbonate thereof so that the sulfur oxides and so forth can be fixed and removed.

In the first scrubbing tank 1, stack gas to be treated is introduced into and bubbled in the first scrubbing liquid, and dust in the gas is removed through contact of bubbles with the first scrubbing liquid.

The extent of the gas-liquid contact is variable depending on how far below the liquid level the opening of the stack gas introduction pipe 2 is positioned.

Accordingly, the first scrubbing tank 1 should necessarily be provided with means for maintaining the liquid level at the prescribed position.

Such liquid-level maintaining means may be any of an arrangement which comprises a weir provided in the tank 1 and in which the liquid is permitted to flow out of the tank over the weir, an arrangement in which a change of the liquid level is detected by a float, a load cell or the like and the quantity of the liquid flowing into or out of the tank is controlled by signals issued responsive to the liquid level detection, and a mechanism as shown in FIG. 1 in which a discharge pipe 4 is provided in a side wall portion of the tank 1 to let the liquid flow out of the tank.

The structure of the opening of the stack gas introduction pipe 2, which is provided with a gas dispersing means 5, may comprise rectangular slits as shown or it may otherwise be any of such structures which can permit gas to be blown into the liquid or, more preferably, permit gas to be divided into portions and bubbled into the liquid such as triangular slits, a porous structure and so forth.

In order to promote and more sufficiently effect the gas-liquid contact than merely by bubbling relied on blowing of stack gas out of the gas introduction pipe 2, it is possible to incorporate an agitator 6 below the gas dispersing means 5 of the gas introduction pipe 2.

Moreover, where the stack gas to be treated contains sulfur oxides and so forth, it is also possible to provide an introduction pipe 7 for an oxygen-containing gas, in a bottom portion of the scrubbing tank 1 to promote oxidation of sulfites to sulfates.

The stack gas scrubbed in the first scrubbing tank 1 is guided into the scrubbing tower 3 and further purified therein.

For the scrubbing tower 3, a packed tower or a plate column having a gas-liquid contact member 8 may be effectively utilized. The stack gas that ascends in the direction shown by an arrow A is further purified through counter-current contact with a second scrubbing solution which is sprayed from an upper portion of the scrubbing tower 3 and thereafter discharged through a discharge opening 12.

The second scrubbing liquid flowing down the scrubbing tower 3 is collected in a second scrubbing tank 9, recycled into the tower 3 through a cooler 11 by a pump 10 and then sprayed again.

Further, a liquid level maintaining means similar to the means described above in connection with the first scrubbing liquid can be used with the second scrubbing liquid.

The portion of the second scrubbing liquid which is discharged through a discharge pipe 4' is put together in a liquid reservoir 17 with the portion of the first scrubbing liquid discharged through the discharge pipe 4 and then recycled by a pump 18 for use for the gas-liquid contact in the stack gas introduction pipe 2.

Further, the first scrubbing tank 1 and the second scrubbing tank 9 are provided with scrubbing-liquid supply pipes 13 and 14 respectively.

Figure 2:
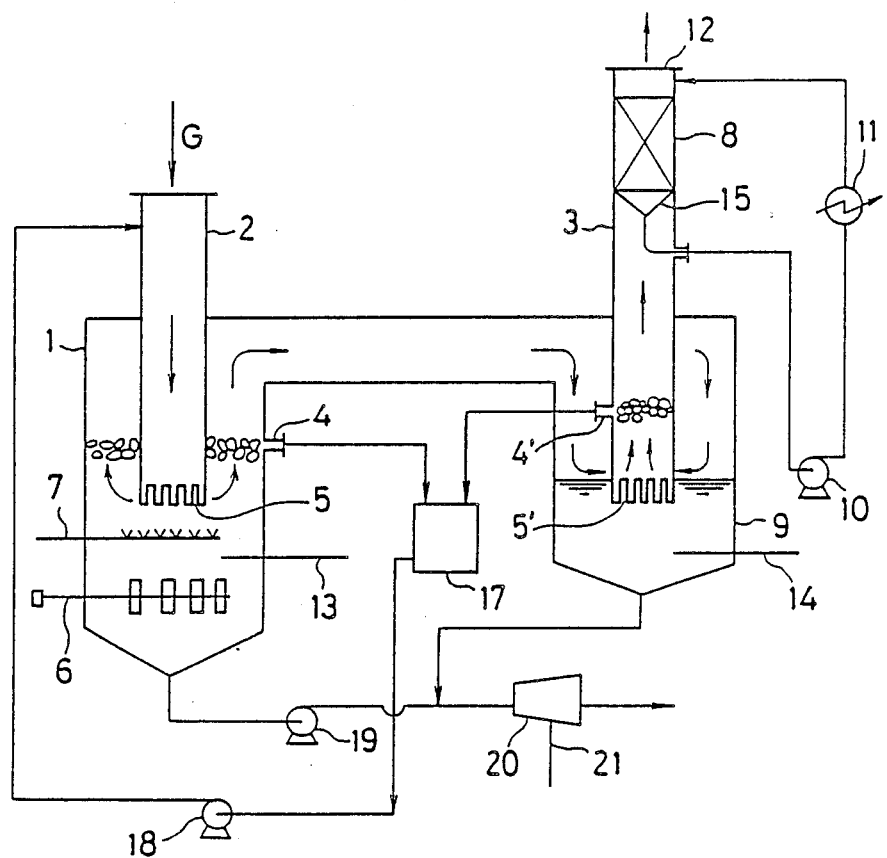
FIG. 2 is a schematic view, showing another embodiment of the wet-process stack gas purification apparatus according to the invention.

FIG. 2 shows another embodiment of the apparatus according to the invention, in which stack gas is scrubbed and purified three times in repetition, and the apparatus of this embodiments differs from the apparatus of FIG. 1 in respect of the following.

First, the scrubbing tower 3 is, alike the stack gas introduction pipe 2, provided at its lower end portion with an opening 5' provided with a gas dispersing means, and extends below the level of the second scrubbing liquid in the second scrubbing tank 9, from above the liquid level. The stack gas scrubbed in the first scrubbing tank 1 is bubbled through the opening 5' into a third scrubbing liquid in the scrubbing tower 3.

Then, the scrubbing tower 3 is provided with a discharge pipe 4' for maintaining constant the level of the third scrubbing liquid.

Also, the scrubbing tower 3 incorporates a same gas-liquid contact member 8 as in the embodiment shown in FIG. 1. The second scrubbing liquid used for the gas-liquid contact in this gas-liquid contact member 8 is collected in a scrubbing-liquid collecting part 15 and then recycled into the gas-liquid contact member 8 through a pump 10.

The portion of the third scrubbing liquid taken out through the discharge pipe 4' at the prescribed liquid level in the scrubbing tower 3 is put together with the portion of the first scrubbing liquid discharged from the discharge pipe 4 and, then through a pump 18, put for use for the gas-liquid contact in the stack gas introduction pipe 2.

The scrubbing liquid subjected to the gas-liquid contact is permitted to flow down in the first scrubbing tank 1 and receives replenishment of water, which was lost as a result of wetting of the stack gas.

Further, the second scrubbing liquid and the third scrubbing liquid may commonly be water or they may be a solution of a same composition as the first scrubbing liquid.

According to the above described embodiment of FIG. 2, the effect of purification can be enhanced without a sacrifice to the structural simplicity of the embodiment of FIG. 1.

Figure 3:
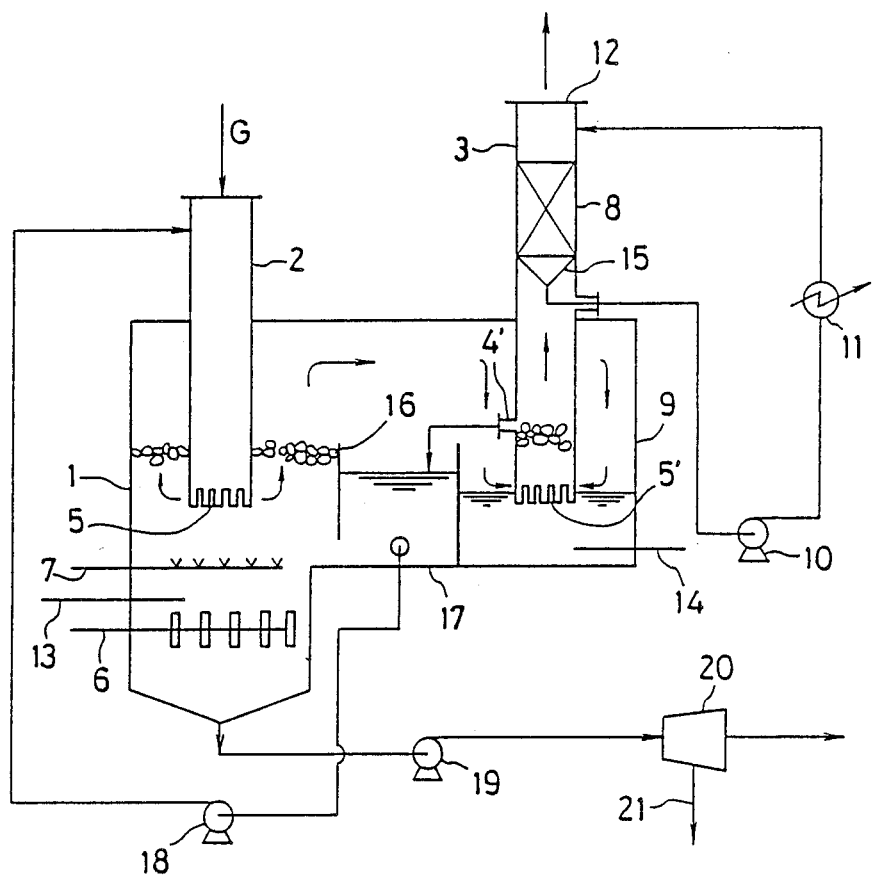
FIG. 3 is a schematic view, showing still another embodiment of the wet-process stack gas purification apparatus according to the invention.

FIG. 3 illustrates still another embodiment of the present invention, in which, while stack gas can be scrubbed for three times as in the embodiment of FIG. 2, a scale-down or size-reduction of the apparatus is realized in comparison to the embodiment of FIG. 2.

That is to say, in the present embodiment the liquid reservoir tank 17 is integrated with each of the first scrubbing tank 1 and the second scrubbing tank 9.

The first scrubbing tank 1 is provided with a weir 16 so that the liquid level in this tank 1 can be maintained constant with the formation of the bubble layer in the tank 1 controlled and, at the same time, the gas-liquid separation can be promoted by the weir 16. The separated portion of the first scrubbing liquid is stored in the liquid reservoir tank 17 and then recycled into the stack gas introduction pipe 2.

Further, the weir 16 has a function to stabilize the liquid level in the liquid reservoir tank 17.

According to the above described embodiment of the invention, illustrated in FIG. 3, it is feasible to realize a further reduction of the size of the apparatus in comparison to the embodiment shown in FIG. 2 while a dust separating capacity comparable to or exceeding that of the apparatus of FIG. 2 is retained.

Now, with reference to FIG. 3, a description will be given the operation of the above described stack gas purification apparatus according to the invention.

First, a stack gas G is charged through the gas introduction pipe 2.

A portion of the first scrubbing liquid which was subjected to a gas-liquid separation by the weir 16 and merged in the liquid reservoir tank 17 with the third scrubbing liquid is sent by the pump 18 into the gas introduction pipe 2 and sprayed into the stack gas G introduced into the pipe 2 as above, whereby the gas G is cooled to a saturation temperature.

From the stack gas introduction pipe 2, the stack gas is bubbled through the gas dispersing means 5 provided to the opening of the pipe 2 into the first scrubbing liquid, and as a result of the gas-liquid contact between minute bubbles of the stack gas and a continuous liquid phase of the first scrubbing liquid, such as dust, sulfur oxides and so forth in the stack gas are transferred into the scrubbing liquid and the stack gas is scrubbed.

The above scrubbed stack gas is then bubbled through the gas dispersing means 5' at the lower end opening of the scrubbing tower 3 into the third scrubbing liquid in the tower 3 and subjected to a second-time scrubbing through a gas-liquid contact, whereby entrained mist, remaining dust, sulfur oxides and so forth in the stack gas are removed.

Then, the stack gas subjected to the second-time scrubbing as above is subjected to a counter-current contact with the second scrubbing liquid preparatively cooled by an external cooler 11 and sprayed in the gas-liquid contact member 8 in the scrubbing tower, whereby the gas is cooled and a thorough removal of entrained mist and remaining dust in the gas is effected, the gas scrubbed for the third time being then discharged from the gas discharge opening 12.

The second scrubbing solution is then recycled into the scrubbing tower.

The dust captured in the first scrubbing tank 1 and the second scrubbing tank 9 is sent by a pump 19 into a centrifugal separator 20, from which the isolated duct 21 is taken out.

EXAMPLE 1

Figure 4:
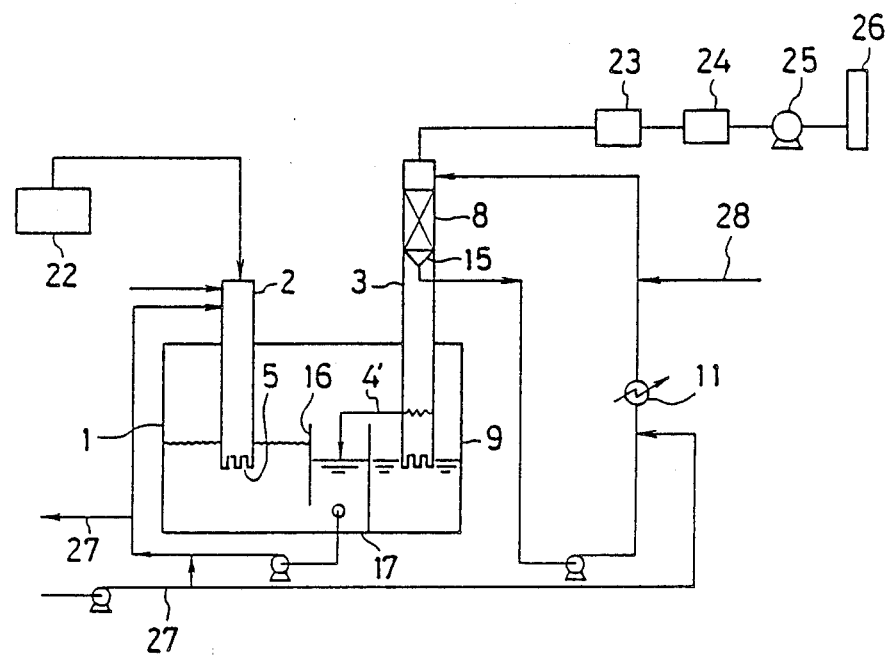
FIG. 4 shows a flow chart of the wet-process stack gas purification method according to the present invention.

Using a wet-process stack gas purification system as represented in FIG. 4, a treatment of the offgas from an incinerator for radioactive wastes was operated.

The used apparatus is substantially the same as the apparatus shown in FIG. 3 according to the third embodiment of the present invention.

In the first place, the offgas generated in an incinerator 22 was guided into the gas introduction pipe 2.

A, first scrubbing liquid from the first scrubbing tank 1 was circulated from the liquid reservoir tank 17 and sprayed into the gas introduction pipe 2 to cool the offgas of about 1000° C. to a saturation temperature of about 70° C.

The above cooled offgas was bubbled through the gas dispersing means 5 provided at an opening of the gas introduction pipe 2 into the scrubbing liquid in the first scrubbing tank 1 and subjected to scrubbing.

Then, the offgas produced by a gas-liquid separation by the weir 16 was guided into the second scrubbing tank 9 and bubbled through the gas dispersing means 5' at the lower end opening of the scrubbing tower 3 into a third scrubbing liquid in the scrubbing tower 3 and subjected to a second-time scrubbing.

The offgas subjected to the second-time scrubbing as above was further purified by a second scrubbing liquid captured in the scrubbing-liquid capturing part 15, circulated and sprayed in the gas-liquid contact member 8.

The offgas subjected to scrubbing for three times and decontaminated as above was heated by a gas heater 23, passed through a final filter 24 and then liberated into air through a suction fan 25 and an exhaust cylinder 26.

Further, the numeral 27 in FIG. 4 shows piping for charging a neutralizer, which was provided so that, since the the scrubbing liquids in the first scrubbing tank 1 and the second scrubbing tank 9 are therein acidified by sulfur oxides and so forth contained in the incinerator offgas, a pH control can be made by way of supplying an alkali for example caustic soda, magnesium hydroxide or the like.

Also, in order to control to a permissible value each of the amount of soot and dust to be accumulated and the concentration of salts formed through neutralization of acids in the first scrubbing tank 1, the scrubbing liquid was intermittently discharged through a drainage pipe 27.

Further, the amount of soot and dust in the second scrubbing liquid sprayed in the gas-liquid contact part 8 and the concentration of the neutralized salts were maintained constant by the flood flow through the discharge or flood-flow pipe 4'.

The scrubbing liquid discharged through the drainage pipe as above was sent into an incinerator and burnt therein.

Further, the numeral 28 denotes a water supply piping. The supply of water through this piping 28 can be done without if it is devised that the amount of condensed water to be generated in the gas-liquid contact part 8 is adjusted by controlling the degree of cooling by the cooler 11.

According to the above described Example, the offgas containing 5 g/Nm$^3$ of soot and dust was introduced into the apparatus, and such content of soot and dust was reduced below a detection limit value when found subsequent to the three-time scrubbing.

EXAMPLE 2

Using the apparatus shown in FIG. 1, a same treatment of gas as in the above described Example 1 was carried out, and it was possible to effect a purification of gas such that 5 g/Nm$^3$ of soot and dust was reduced to 2 mg/Nm$^3$.

CAPABILITY OF EXPLOITATION IN INDUSTRY

In or with the wet-process stack gas purification method and apparatus according to the present invention, it is possible to effect scrubbing of a stack gas for at least two times by a gas-liquid contact made of the stack gas and a first scrubbing liquid at the opening of a stack gas introduction pipe provided with a gas dispersing means and by a gas-liquid contact of the gas and a second scrubbing liquid in a scrubbing tower.

Accordingly, it is feasible to effectively remove dust and so forth contained in stack gas.

Such present invention is particularly effectively useful in the treatment and disposal of stack gas from incinerators for radioactive wastes in which it is required to attain an extremely high decontamination effect.

In addition, the invention is structurally so simple as to comprise a combination together of a first scrubbing tank and a scrubbing tower, and according to the invention, it is feasible to realize a reduction in size of the apparatus.

Also, the invention does not require any particular complex operation to be made.

By and with such wet-process stack gas purification method and apparatus according to the invention, for example a stack gas from a radioactive-waste incinerator may be treated to attain the following results:

Soot and dust: a decontamination factor at the gas outlet of the gas introduction pipe 2 of $10^3$ to $10^4$, and a decontamination factor at the gas outlet of the scrubbing tower 3 of $10^5$.

Iodine and the like: a decontamination factor at the gas outlet of the scrubbing tower 3 of a value on the order of $10^3$.

We claim:

1. A wet-process stack gas purification method by which radioactive dust sulfur oxides and other contaminants contained in stack gas from a radioactive waste incinerator are removed by contacting the stack gas with a scrubbing liquid, comprising the steps of:

scrubbing the stack gas by bubbling the gas out of a stack-gas introduction pipe into a first scrubbing liquid which is selected from the class consisting of water, an alkaline aqueous solution and an alkaline aqueous suspension solution and maintaining a constant liquid level of the first scrubbing liquid by a first liquid level maintaining means; further purifying the gas scrubbed by the first scrubbing liquid by a counter-current contact with a second scrubbing liquid, in a scrubbing tower, said second scrubbing liquid being selected from the class consisting of water, an alkaline aqueous solution and an alkaline aqueous suspension solution, and maintaining the liquid level of the second scrubbing liquid by a second liquid level maintaining means;

collecting together a portion of the first scrubbing liquid and a portion of the second scrubbing liquid from the respective liquid level maintaining means and cycling the collected liquid portions into the stack-gas introduction pipe for contact with stack gas; and recycling the remaining portion of the second scrubbing liquid present in the scrubbing tower for counter-current contact with the scrubbed gas in the scrubbing tower.

2. A wet-process stack gas purification method by which radioactive dust sulfur oxides and other contaminants contained in stack gas from a radioactive waste incinerator are removed by contacting the stack gas with a scrubbing liquid, comprising the steps of:

scrubbing the stack gas by bubbling the gas out of a stack-gas introduction pipe into a first scrubbing liquid which is selected from the class consisting of water, an alkaline aqueous solution and an alkaline aqueous suspension solution and maintaining a constant liquid level of the first scrubbing liquid by a first liquid level maintaining means;

purifying the gas scrubbed by the first scrubbing liquid by bubbling it into a second scrubbing liquid which is selected from the class consisting of water, an alkaline aqueous solution and an alkaline aqueous suspension solution and maintaining the liquid level of the second scrubbing liquid constant by a second liquid level maintaining means in a scrubbing tower having an open lower end disposed below said liquid level; further purifying the gas scrubbed by the second scrubbing liquid by subjecting it to a counter-current contact with a third scrubbing liquid selected from the class consisting of water, an alkaline aqueous solution and an alkaline aqueous suspension solution;

collecting together a portion of the first scrubbing liquid and a portion of the second scrubbing liquid discharged from the respective liquid level maintaining means and cycling the collected scrubbing liquid portions to the stack-gas introduction pipe for contact with the stack gas; and recycling the third scrubbing liquid for counter-current contact with the purified gas.

* * * * *